Dec. 18, 1945.  C. H. KLEIN  2,391,317
GRINDING FIXTURE
Filed Sept. 4, 1943  3 Sheets-Sheet 1

INVENTOR.
Charles H. Klein
BY Wood, Arey, Herron & Evans
Attorneys.

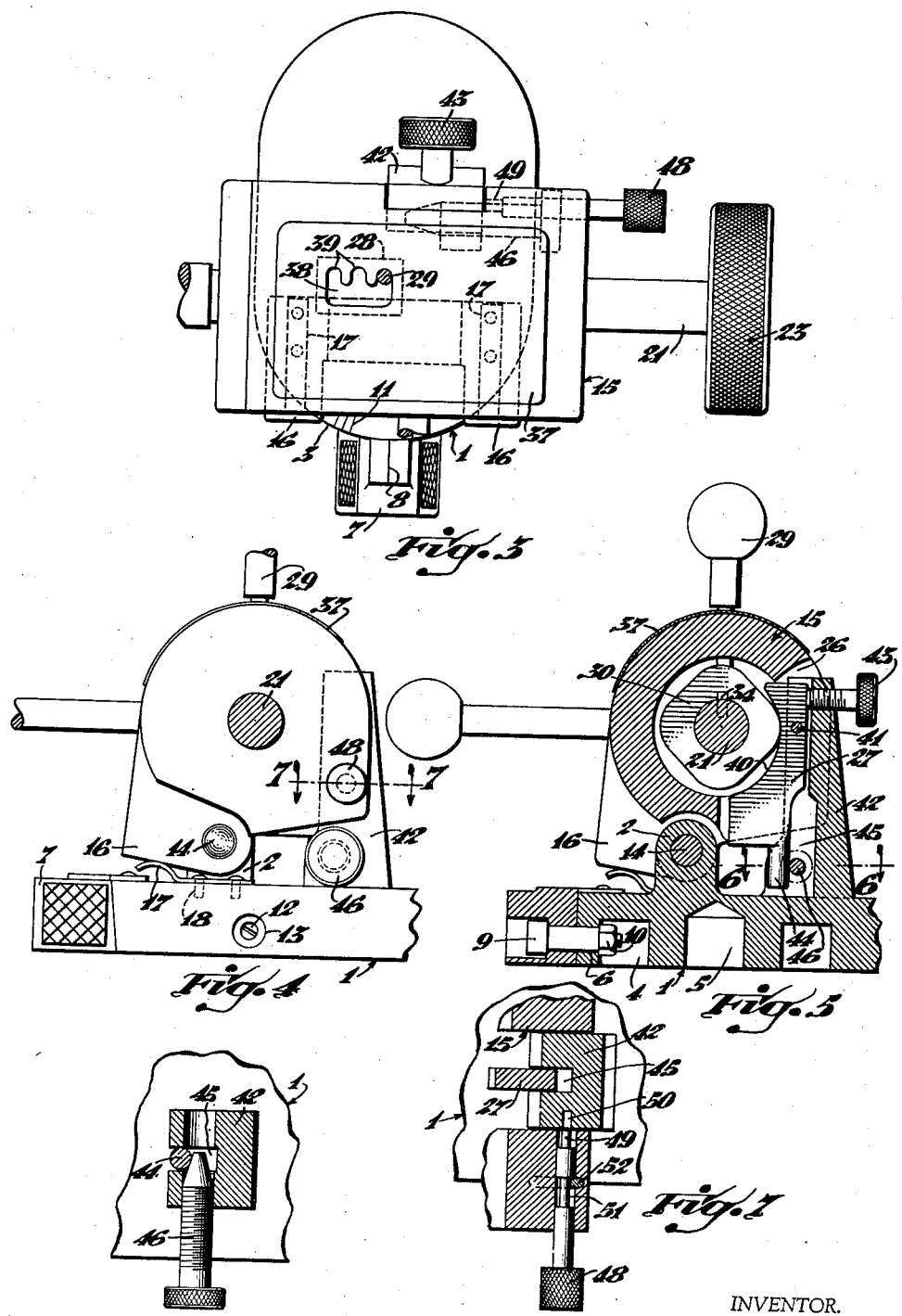

Dec. 18, 1945.   C. H. KLEIN   2,391,317
GRINDING FIXTURE
Filed Sept. 4, 1943   3 Sheets-Sheet 3
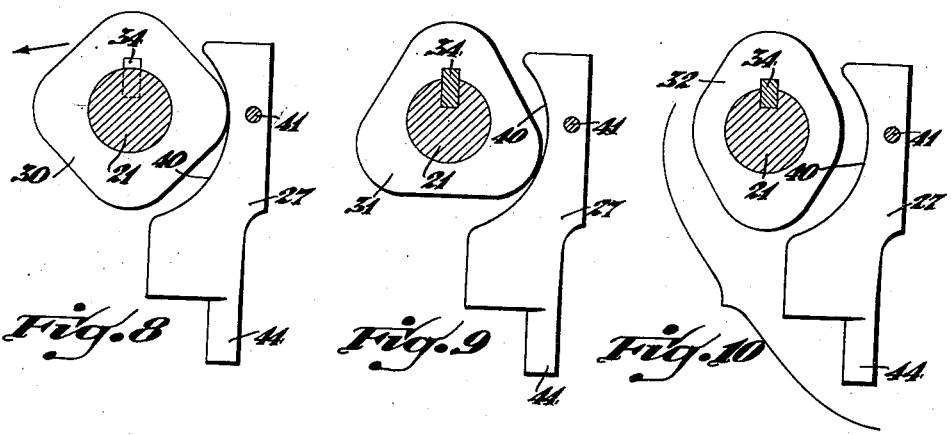
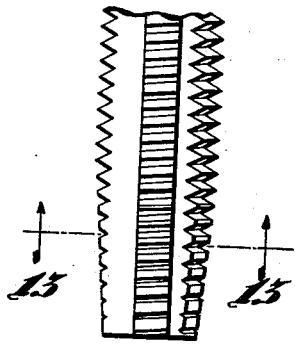
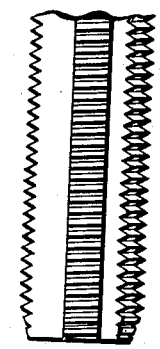
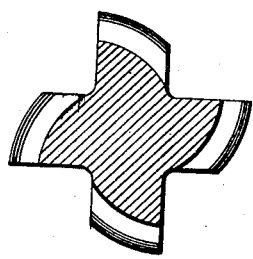
INVENTOR.
Charles H. Klein
BY Wood, Arey, Herron & Evans
Attorneys Patented Dec. 18, 1945

2,391,317

UNITED STATES PATENT OFFICE 2,391,317

GRINDING FIXTURE

Charles H. Klein, Cincinnati, Ohio, assignor to Progress Lithographing Company, Reading, Ohio, a corporation of Ohio Application September 4, 1943, Serial No. 501,255

5 Claims. (Cl. 51—101)

This invention relates to a tool grinding fixture and is directed particularly to a device for holding and for guiding taps, drills, reamers, and the like against the surface of a grinding wheel in order that the cutting edges thereof may be ground and sharpened. The fixture is intended to be mounted upon a work table of a cutter grinder, surface grinder or similar machine tool presenting a grinding wheel, and the principal purpose of the present invention has been to provide a device through which the cutting edges of tools having various numbers of flutes may be ground uniformly with appropriate relief, or backing off of the cutting edges. Otherwise expressed, the invention contemplates a device for holding a tool and guiding or moving it cyclically toward and from the cutting surface of a grinding wheel during rotation of the tool in order that the cutting edges may be backed off as the tool is being sharpened.

The number of cyclic shifting movements toward and from the wheel surface for each rotation of the tool may be varied conveniently according to the number of flutes of the tool, that is, according to the number of cutting edges provided at its periphery. For instance, in this respect, the purpose of the invention is to provide a device adjustable for grinding threading taps having various numbers of flutes, for instance, two, three or four, through a simple axial shifting movement of the tool holder.

Various tools must be ground at different chamfer angles; thus the leading edges of a tap intended for bottoming service are chamfered much more steeply than if the tools are to be used for general purpose tapping; this angle also varies with respect to the nature of the material to be threaded. To accommodate such variations, an objective of the present invention has been to provide a structure in which the angular position of the grinding fixture may be adjusted conveniently and quickly to grind tools at the proper or desired angle.

The invention, briefly, contemplates a structure in which a head is mounted pivotally on a base. A shaft carrying a chuck at its one end and an operating handle at the other rotatably is journaled within the head wherein it carries a plurality of cams having different numbers of lobes corresponding to the numbers of the flutes on the tool to be ground. The base carries a stationary but adjustable cooperating guide member and the shaft is movable axially for selectively positioning a given one of the cams in operative engagement with the guide, while a detent arrangement extending laterally from the shaft is provided for holding it against axial movement after it has been set in a given position.

As the shaft is rotated the lobes of the selected cam cause pivotal shifting of the head whereby the tool is moved toward and from the surface of the grinding wheel as many times during each cycle of rotation as the cam has lobes.

A finger tab is mounted for movement partially around the periphery of the base and it carries a reference mark which cooperates with graduations on the base denoting various chamfer angles. The fixture is set up on the table of a grinding machine with the tab at zero on the reference scale and the axis of the tool substantially parallel with the cutting surface of the grinding wheel. Then, while the tab is held stationary, the base is rotated to the desired angle indicated on the scale after which the base is clamped to the supporting surface of the machine.

Various grinding fixtures having the purposes of the present apparatus have been known in the past but this invention is directed particularly to a structure which is considerably more simple to use than previous devices and less difficult to adjust properly. It is also to be noted that while the invention is disclosed in relation to the use of the apparatus in grinding taps it also may be employed for grinding the leading edges of reamers, boring tools and other types of cutters which require backing off of the cutting edges with resharpening.

From the foregoing principles of the invention and from the following detailed description of a preferred embodiment of it as shown in the drawings, those skilled in the art readily will comprehend the various modifications to which the invention is susceptible.

In the drawings:

Figure 3 is a top plan view.

Figure 4 is an elevation looking at the end of the apparatus from the tool supporting head.

Figure 5 is a transverse sectional view.

Figure 6 is a fragmentary plan view taken on the line 6—6 of Figure 5.

Figure 7 is a fragmentary sectional view taken on the line 7—7 of Figure 4.

Figures 8, 9 and 10 are diagrammatic views showing the operation of cams respectively arranged for backing off the cutting edges of four-flute, three-flute and two-flute taps.

Figures 11 and 12 are elevations showing the appearance of the chamfers of conventional and bottoming taps respectively.

Figure 13 is a sectional view taken on the line 13—13 of Figure 11 showing the backing off of the cutting edges.

Figure 1:
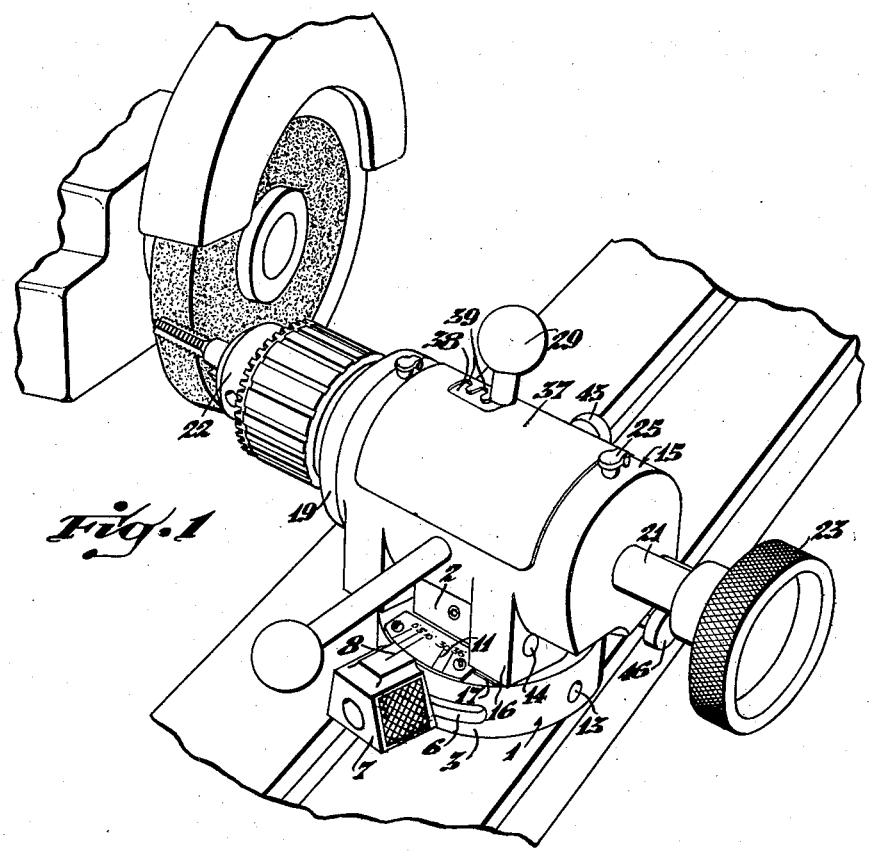
Figure 1 is a perspective view of the apparatus mounted on a table adjacent a grinding wheel in a representative arrangement in which the fixture is employed.
Figure 2:
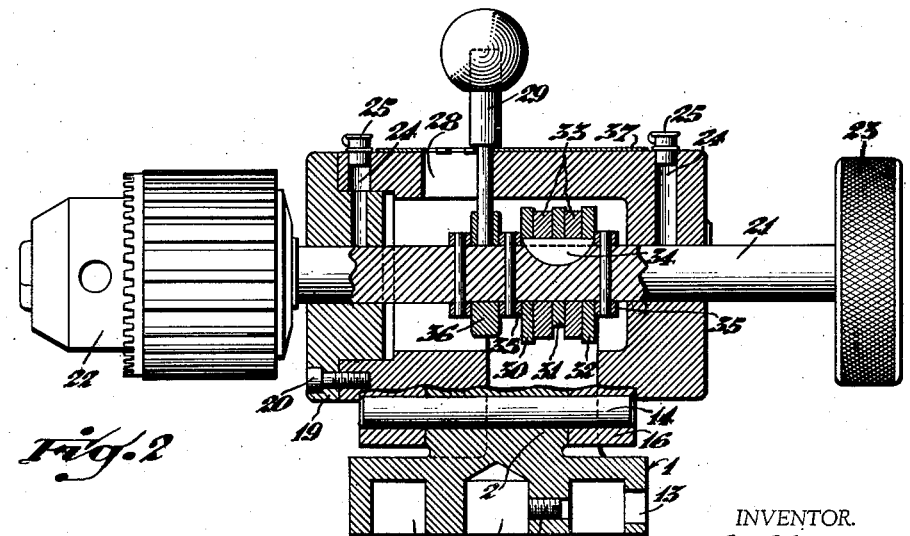
Figure 2 is a sectional elevation taken longitudinally of the apparatus.

In the device shown in the drawings the base, indicated generally at 1, is an elongated member having a lug 2 extending from its upper surface and having an arcuate edge 3 at an endwise portion thereof. An annular recess 4 surrounding a central bore 5 is located in the lower face. The bore 5 provides a cavity for receiving a locating post or the like and a slot 6 enters the annular recess 4 from the arcuate edge 3. A reference tab 7 having a reference line 8 thereon mates with edge 3 of the base and is held slidably thereto through a bolt 9 which passes through the slot 6 to carry a nut 10 in the annular recess 4. The slot permits the base to be rotated to a given angular position while the tab 7 is being held between the fingers, whereby angle markings 11 carried on the surface of the base adjacent the arcuate edge 3 may be brought into alignment with the reference marker 8.

A set screw 12, which is accessible through a bore 13 in a sidewise portion of the base, is provided to enable the base to be fastened to a post located in the central cavity 5.

Lug 2, projecting from the upper surface of the base, is bored in a horizontal direction to receive a pin 14 which pivotally carries the head of the apparatus indicated generally at 15. In the structure shown, the head is a substantially cylindrical body, hollow, and having lugs 16 extending from its lower outer surface to straddle the lug 2. Spring clips 17, fastened to the base through the screws 18, extend upwardly therefrom to press against the lower surfaces of the lugs 16 and thereby bias the head in one direction of pivotal movement. The forward portion of the body is counterbored to receive a cap 19 which is held in place by means of screws 20.

Cap 19 and the opposite end of the body are bored longitudinally thereof to receive a shaft 21 which, at the forward end, carries a chuck 22, and at the opposite end, an operating knob 23. The chuck is of a conventional type having adjustable jaws for holding the shank of a tool which is to be ground. Oil holes 24 fitted with oiling caps 25 are provided at the endwise portions of the body for lubricating the shaft bearings.

The back part of the body is cut away, as at 26, to receive a stationary cam guide 27. The upper part of the body also has an opening 28 communicating with the interior thereof for receiving a shifting lever 29, as described at a later point in the specification.

Internally of the body, a cluster of cams is carried by the shaft 21; these are designated 30, 31 and 32 respectively. They are separated from one another through the spacers 33. The entire cluster of cams and spacers is fixed to the shaft through the key 34 and the cluster is held in assembly by means of collars 35 at each end thereof, the collars being fixed to the shaft through pins.

Cams 30, 31 and 32 present different numbers of lobes respectively; cam 30, for instance, being a four-lobe member, while cams 31 and 32 are three- and two-lobe members respectively for grinding taps having corresponding numbers of flutes. Two-, three- and four-flute taps are the most conventional taps but it will be understood that these are representative only and that various other types of cams may be employed to suit the fluting of the tools as necessary or desirable.

Between the forward collar 35 and a similar collar which is spaced from it, a ring 36 is carried by the shaft which, in turn, supports the shifting lever 29. This lever passes outwardly through the opening 28 and provides the means for moving the shaft 21 axially of the head. At the upper portion of the housing, a plate 37 is mounted which has an opening 38 cut into it in alignment with the opening 28 which provides a series of notches 39 corresponding to the axial positions of the shaft in which the respective cams 30, 31 and 32 are in alignment with the stationary cam guide 27.

Stationary member 27 has a curved surface 40 which constitutes a guiding surface for the lobes of the respective shaft cams, and this member is adjustably mounted through a pin 41 supported by a post 42 extending upwardly from the base 1 at the back portion of the head. The pivotal axis of the guide member is substantially in horizontal alignment with the shaft 21 while the post 42, at a higher level, is bored to receive a thumb screw 43 having its inner edge abutting the back surface of the cam plate 27. The lower edge of the cam plate has a boss 44 extending toward the base through a slot 45 which is cut in the post 42 while the post, in turn, is bored laterally to receive another thumb screw 46 having a tapered inner end for wedging engagement with the tailpiece of the guide member. Thus, thumb screws 43 and 46 constitute the means for locking the guide member 27 in any given position of adjustment. As the wedge screw 46 is released, the thumb screw 43 may be screwed down to alter the point at which the lobes on the rotatable cams engage the surface of the stationary cam, whereby the throw of the head and the point at which the throw begins may be varied to govern the shape and degree of relief of the tool being ground.

In order to permit the head to be held against pivotal movement when the guide 27 is backed away to clear the lobes of the rotatable cams, a locking pin 48 is mounted at the back part of the head to present a pin 49 which may be introduced into a recess 50 in the post 42. The pin 48 intermediate its length has a counterturn portion 51 which provides clearance for the passage of a keeper pin 52 whereby the pin 48 may be shifted axially into and out of engagement in the recess 50 without becoming disassembled from the apparatus.

In using the grinding fixture, it is first set up on the machine so that the axis of the shaft 21 is parallel or substantially parallel with the cutting surface of the grinding wheel, for instance, the peripheral edge as shown in Figure 1; then, traversing the table so that the apparatus is moved away from the grinding wheel, the base is turned to the desired chamfer angle as indicated by the indicia on the base, while the tab 8 is being held against movement. The fixture next is clamped in place.

A tool which is to be ground is inserted loosely in the chuck while the shaft 21 is shifted longitudinally until the lever 29 enters the notch in the plate 37 which corresponds to the number of flutes in the workpiece. Handle 23 is then rotated until the entire body of the apparatus is shifted to its position of greatest throw and the tool in the chuck is rotated until the cutting edges are closest to the wheel, next the chuck is tightened. It will be seen that this operation coordinates the alignment of the flutes or cutting edges of the tool with the lobes on the cam. The work table is shifted until the entire apparatus brings the cutting edge of the tool in grinding contact with the wheel. As the handle 23 now is rotated, the rotatable cam permits the head to be moved toward the wheel under the action of the springs 17, bringing the tooth being ground into greater cutting contact with the wheel to provide for its relief. The head is shifted pivotally, as rotation continues, while the tool flute is passing the wheel, and, by the time the next successive cutting edge approaches the wheel surface, the tool has been moved to the point most remote from the wheel for repetition of the operation just described. Thus, if a four-flute tap is being ground, the head is shifted pivotally four times during each rotation of the operating handle, bringing the successive teeth into cutting and relieving contact with the wheel surface. If the next tool to be ground has a different number of flutes, the lever 29 is removed from the notch and shifted longitudinally and entered into a notch in plate 37 which is proper for that tool.

The fixture may be used for concentric grinding without relief or backing off, shifting the head until the pin 49 is free to enter the slot 50 to lock the head against further shifting movement. The introduction of the lever 29 into any one of the notches of the plate 37 will lock the shaft against axial movement.

It will be understood that any tool holding device can be used in place of the chuck 22, such as spring collets, sleeves or adapters. The jaw chuck as shown in the drawings is preferred because it is inexpensive yet accurate for holding tools of a variety of different sizes.

Having described my invention, I claim:

1. A tool grinding fixture, comprising a base having a post extending upwardly therefrom, a member presenting a guiding surface pivotally mounted on said post and means for locking said member in various positions of adjustment thereof, a body pivotally mounted on said base and biased toward said guiding member, a shaft rotatably carried by said body and movable longitudinally therein, cam members carried by said shaft for selective engagement with said guiding member through longitudinal movement of said shaft and arranged to effect shifting movement of said body upon shaft rotation, detention means for holding said shaft against longitudinal movements thereof and tool holding means carried by said shaft in axial alignment therewith.

2. A tool grinding fixture, comprising a base having an arcuate portion and having a reference scale adjacent said arcuate portion, a tab contacting and slidable around the arcuate portion of said base and having graduation means thereon cooperating with said reference scale whereby angular adjustments of said base from a given position may be noted by holding said tab stationarily between the fingers, a head providing a rotatable tool holding shaft pivotally mounted on said base, and means for cyclically shifting said head upon rotation of said shaft thereof.

3. A tool grinding fixture, comprising a base having a member presenting a guiding surface, a head pivotally mounted on said base and biased toward said guide, a shaft mounted in said head for axial and rotatable movements with respect thereto, a series of cams carried by said shaft for selective engagement with said guiding surface, the said cams being arranged to effect shifting movement of the head a number of times corresponding to the number of lobes thereon during each cycle of rotation of said shaft, and tool holding means carried by said shaft in axial alignment therewith.

4. A grinding fixture, comprising a base having a member extending therefrom presenting a guiding surface, a head shiftably mounted on said base, a shaft supported by said head and movable rotatably and longitudinally therein, a plurality of cams carried by said shaft for selective engagement with said guiding surface, the said cam means having respectively different numbers of lobes thereon and effective for causing cyclic shifting movements of said head during rotation of said shaft, a plurality of notches in said head, a shifting lever extending laterally from said shaft for selective engagement with said notches, and means carried by said shaft for holding a tool in axial alignment therewith.

5. A grinding fixture, comprising a base having a post extending upwardly therefrom, a member presenting a guiding surface pivotally mounted on said post, means for adjusting the position of said guiding surface and for locking said member against movement after adjustment thereof, a head shiftably mounted on said base and biased toward said guiding surface, a shaft supported by said head for rotatable and longitudinal movements with respect thereto, a plurality of cams carried by said shaft for selective engagement with said guiding surface, each of said cams being of different contour and arranged to effect cyclic shifting movements of said head upon said shaft, said head providing a series of notches corresponding to said cams and said shaft having a shifting lever extending therefrom and positioned for cooperation with said notches to hold the shaft against axial movement without interfering with rotation thereof, and tool holding means carried by said shaft.

CHARLES H. KLEIN.